United States Patent [19]

Gladden

[11] 4,187,106
[45] Feb. 5, 1980

[54] PROCESS FOR MAKING PHASE HOLOGRAMS

[75] Inventor: James W. Gladden, Alexandria, Va.

[73] Assignee: The United States of America as represented by the Secretary of the Army, Washington, D.C.

[21] Appl. No.: 23,217

[22] Filed: Mar. 23, 1979

[51] Int. Cl.² .......................... G03C 5/04; G03C 5/32
[52] U.S. Cl. .......................................... 430/1; 430/264
[58] Field of Search ............................. 96/27 H, 60 R

[56] References Cited

U.S. PATENT DOCUMENTS

| | | | |
|---|---|---|---|
| 3,617,274 | 11/1974 | Lin | 96/27 H |
| 3,728,118 | 4/1973 | Fillmore et al. | 96/27 H |
| 3,816,130 | 6/1974 | Eggers et al. | 96/27 H |
| 3,891,436 | 6/1975 | Nishida | 96/27 H |

Primary Examiner—Richard C. Schilling
Attorney, Agent, or Firm—Thomas O. Maser

[57] ABSTRACT

A process for the production of a phase hologram of tanned gelatin in a gelatin matrix from silver halide photographic material is disclosed in which the silver halide photographic material is exposed, developed with a non-tanning developer, bleached with a tanning bleach which removes the metallic silver of the metallic silver image areas while tanning the gelatin in the metallic silver image areas, and is fixed with a non-tanning fixing agent to remove the silver halide from the photographic material.

5 Claims, 3 Drawing Figures

PROCESS FOR MAKING PHASE HOLOGRAMS

BACKGROUND OF THE INVENTION

This invention relates to the field of holography and, more specifically, to a process for making phase holograms in photographic material.

Production of phase holograms has been carried out through a number of different photosensitive processes. Two broad categories of processes related to this invention are bleached silver halide processes and dichromated gelatin processes.

In a bleached silver halide process, silver halide photographic material is exposed in a holographic optical system, developed and fixed afterwhich it is treated with a bleach which converts the silver metal in the exposed areas of the material to a silver salt. Bromine vapor for example is a known bleaching agent and, when applied to the emulsion, a phase volume hologram is formed consisting of silver bromide in a gelatin matrix. The difference in refractive indexes between the silver bromide or other silver salt and the gelatin produces the diffraction that is the basis of the hologram.

The primary difficulties with the bleached silver halide processes are the production of light scatter or noise by the silver halide crystallites in the emulsion and print-out darkening in which the silver halide is reduced to silver metal over time by actinic light.

U.S. Pat. No. 3,755,111 to Norman is both an example of a bleached silver halide process and of a solution proposed for dealing with the print-out darkening problem. In Norman after a silver halide is formed in the bleaching step, the hologram is treated with a composition which desensitizes the silver halide. Another U.S. Pat. No. 3,891,436 to Nishida, is concerned with the bleached silver halide process and proposes the conversion of the silver salt formed in the bleaching step to a compound of another metal to prevent the print-out darkening phenomenon.

A variation of the bleached silver halide process which produces holograms having low noise levels involves the making of a reverse bleached silver halide hologram. In this type process the hologram is developed but not fixed while the metallic silver is bleached to a soluble silver salt which is removed. This reversal bleaching process is described by Lamberts and Kurtz in an article appearing in *Applied Optics,* Volume 10, No. 6, June 1971, pages 1342–1347, and in U.S. Pat. No. 3,816,130 to Eggers, which further suggests desensitizing of the unfixed residual silver halide left after this bleaching step.

In the Lamberts and Kurtz process a tanning developer of the pyrocatechol type is used which promotes tanning of the gelatin in those regions where the metallic silver is developed out. Tanning is also promoted by the bleach used by Lamberts and Kurtz, a bleach whose principal ingredients are potassium dichromate and sulfuric acid. In Eggers, an improved hologram is produced by using a non-tanning developer although a potassium dichromate and sulfuric acid tanning bleach is used as in Lamberts and Kurtz.

In the reverse bleached silver halide process as with the basic bleached silver halide process the difference in the refractive indexes between the silver halide and the gelatin produces the diffraction which is the basis of the hologram. Also, with these bleached silver halide processes, whether involving direct or reverse bleaching, a photosensitive ingredient is left requiring desensitizing treatment to avoid print-out darkening.

The second broad category of processes related to this invention is the hardened dichromated gelatin type process. While this type process produces a hologram with minimal light scatter or noise and no print-out darkening, the process does not have the light sensitivity or spectral response of the bleached silver halide processes and, in addition, the sensitized dichromated gelatin does not have storage stability and must be used shortly after preparation for best results. To explain, the hardened dichromated gelatin plates are prepared usually from fixed silver halide emulsions. The plates are sensitized by soaking in an ammonium dichromate solution, dried, and then exposed. Following exposure the plates are washed in running water to remove the remaining dichromate sensitizer and dehydrated in isopropanol baths. The phase hologram formed consists of crosslinked or tanned gelatin in a gelatin matrix. The difference in refractive indexes between the tanned and the untanned gelatin produces the diffraction that is the basis for the hologram. The absence of print-out darkening is due to the absence of any light sensitive silver salt in the final product. Thus, no densensitizing treatment is required.

The important feature, a light stable hologram, requiring no desensitizing, which is the result of a product whose diffraction is due solely to the presence of a tanned gelatin in a gelatin matrix has not lead to the use of the tanning effect in the bleached silver halide type process. This despite the fact that in bleached silver halide processes such as those taught by Eggers and Lamberts and Kurtz, tanning bleaches and tanning developers have been used.

OBJECTS AND SUMMARY OF THE INVENTION

An object of this invention is to provide a process for making phase holograms which has the advantages of the bleached silver halide type process and the hardened dichromated gelatin type process without their disadvantages.

An object of this invention is to provide a process for making phase holograms which has the advantages of lower exposure requirements, spectral sensitivity, and storage life of the bleached silver halide processes and the minimal light scatter or noise and the absence of print-out darkening of the hardened dichromated gelatin holograms.

Another object of this invention is to provide a process for making phase holograms of a tanned gelatin in a gelatin matrix using a silver halide gelatin starting material.

An object of this invention is to provide a process for making a phase hologram from a silver halide gelatin which will contain no metallic silver or silver salts or other metal salts or dyes at the end of the process.

A further object of this invention is to provide a process for making phase holograms from a silver halide gelatin which will require no desensitizing treatment to prevent print-out darkening of the finished hologram.

Another object of this invention is to provide a process for making a phase hologram in which the tanning is performed in one step by the bleaching agent.

A further object of this invention is to provide a process for making a phase hologram from a silver halide gelatin in which the metallic silver in exposed areas is dissolved and removed by a tanning bleach which also acts to harden the gelatin in those exposed areas and in which the silver halide of the unexposed areas is removed by a non-tanning fixing agent.

The invention is a process for the production of a phase hologram comprising the steps of: exposing silver halide photographic material in the exposure plane of a holographic optical system; developing the exposed photographic material with a non-tanning developer; bleaching the developed photographic material with a tanning bleach which removes the metallic silver of the metallic silver image areas of the photographic material while tanning the gelatin in the metallic silver image areas; and, fixing the bleached photographic material with a non-tanning fixing agent to remove the silver halide from the photographic material so as to form a phase hologram of a tanned gelatin in a gelatin matrix.

DETAILED DESCRIPTION

Figure 1:
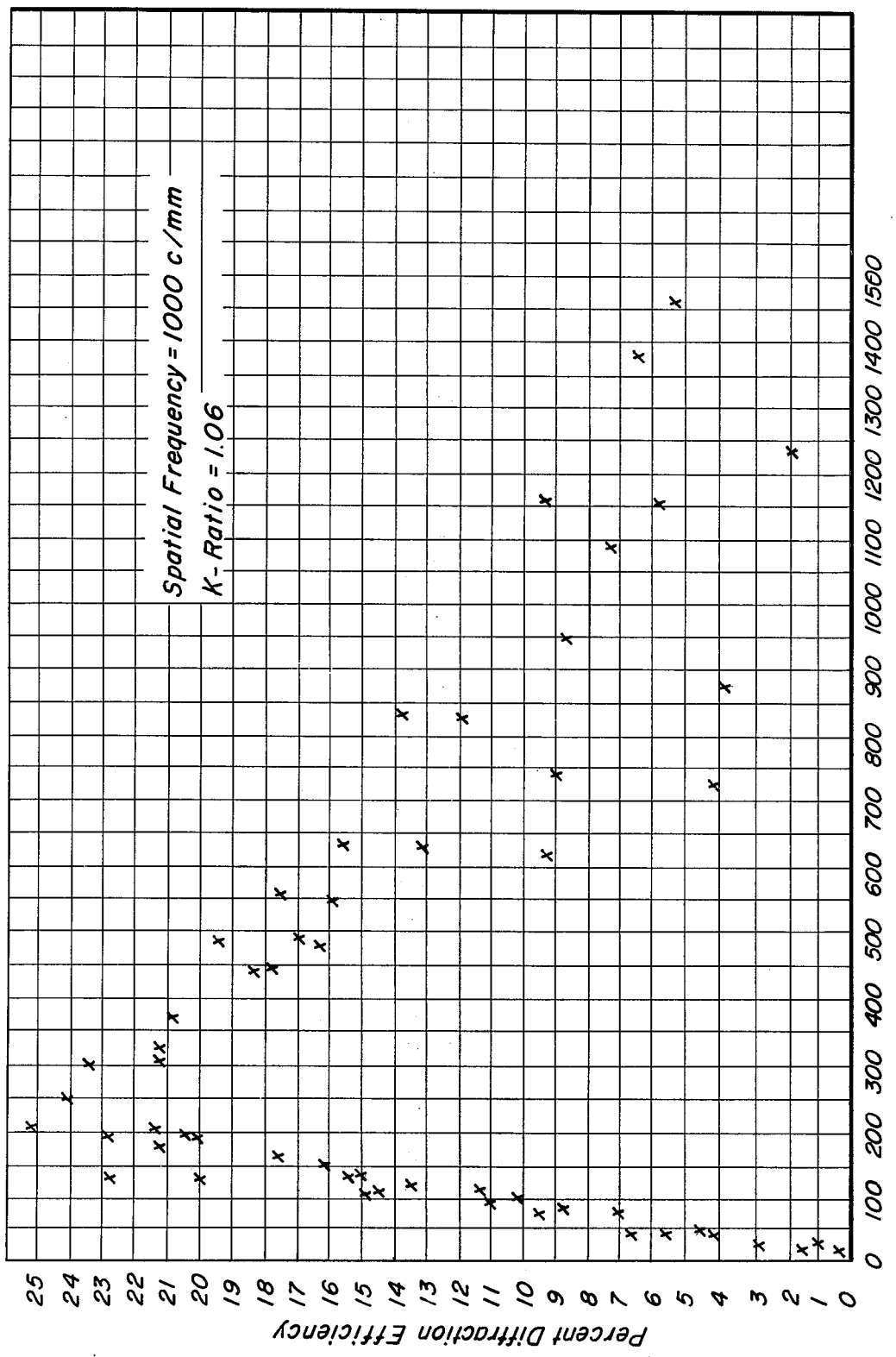
FIG. 1 is a graph showing percent diffraction efficiency as a function of exposure for the holograms produced by the process of this invention.

In the process according to this invention, a high resolution, panchromatic, silver halide material in the form of a film or plate, such as a Kodak 649F plate, is located in the exposure plane of a holographic optical system. The material is then exposed. Exposures on the order of a few tenths (0.2 to 0.3) milliJoules/square centimeter ($mJ/cm^2$) may be used at any wavelength in the visible light spectrum. Following exposure the material is developed in a non-tanning developer, such as Kodak D-19 developer, which is a high contrast developer that is known not to promote gelatin tanning to any great extent because of the large quantity of sodium sulfite present. The developed material is then treated in a stop bath, such as a Kodak SB-1 stop bath.

After rinsing with running water the developed material is bleached with a composition which functions to both crosslink or tan the gelatin in the silver metal image areas while dissolving the silver metal away. The preferred bleaching agent is a potassium dichromate bleach, such as Kodak R-9 bleach. It is believed that the reaction mechanism of the bleaching step involves the formation of chromium III ions, $Cr^{+3}$, according to the following formula:

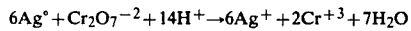

$$6Ag° + Cr_2O_7^{-2} + 14H^+ \rightarrow 6Ag^+ + 2Cr^{+3} + 7H_2O$$

TABLE I

| PROCESS STEPS | | |
|---|---|---|
| Step | Time | Temperature °C. |
| 1. Develop, Kodak D-19 | 5 min | 20 |
| 2. Stop Bath, Kodak SB-1 | 15 sec | 18–21 |
| 3. Rinse, running water | 1 min | 18–21 |
| 4. Bleach, Kodak R-9 | 3 min | 18–21 |
| 5. Wash, running water | 10 min | 18–21 |
| 6. Clear, Kodak S-13, Solution B | 1 min | 18–21 |

TABLE I-continued

| PROCESS STEPS | | |
|---|---|---|
| Step | Time | Temperature °C. |
| 7. Wash, running water | 5 min | 18–21 |
| 8. Fix, Kodak F-24 | 3 min | 18–21 |
| 9. Wash, running water | 10 min | 18–21 |
| 10. Rinse, distilled water | 2 min | 18–21 |
| 11. Rinse, 50% isopropanol, 50% dist. water | 3 min | 18–21 |
| 12. Dehydrate, 100% isopropanol | 4 min | 18–21 |
| 13. Dry, in Air | 30 min | 18–21 |
| 14. Dry, in Desiccator over Anhyd $CaCl_2$ | 15 hours | 18–21 |

The chromium III ion then crosslinks or tans the gelatin in the immediate vicinity of the silver metal image. Since the developer used is a non-tanning developer, the primary source of tanning is the chromium III reduction product of potassium dichromate. The crosslinking is the result of the interaction of the chromium III with the active side groups of the amino acids making up the polyamide structure of the gelatin molecular strands.

After bleaching, the photographic material is first washed with running water to remove remaining bleach and then treated with a clearing agent, such as Kodak S-13, Solution B, to remove any residual bleach not removed by the running water. The photographic material is then washed again with running water.

Next the photographic material is fixed using a non-tanning fix, such as Kodak F-24 fix, to remove the silver halide from the emulsion without causing further crosslinking or tanning of the gelatin which would reduce the diffraction efficiency of the plane wave gratings formed. At this point all silver metal and silver halide has been removed from the photographic material and the degree of tanning in any area is correlated to the degree of bleaching. By using the non-tanning fix, no further crosslinking of the gelatin is introduced in the emulsion by the fixing step whose single function is the removal of all remaining silver salts in the gelatin layer.

After fixing, the photographic material is first washed with running water and then rinsed with distilled water followed by a 50% isopropanol, 50% distilled water solution. The plate is then dehydrated with a 100% isopropanol solution and finally dried.

The phase volume hologram thus formed consists of crosslinked or tanned gelatin in a gelatin matrix. There is only the gelatin, and no silver metal or silver salts are present. The difference is refractive indexes between the crosslinked or tanned gelatin and the non-crosslinked or untanned gelatin produces the diffraction that is the basis of the hologram. The mechanism by which this refractive index difference occurs in the gelatin is not well understood but is believed to be due to the presence of some sort of air cracks or micropores interfacing with the exposed and further tanned or crosslinked gelatin.

After the bleaching step followed by the post bleach washing and clearing steps, the photographic material may be brought into the light where diffraction in the grating regions formed by the silver halide areas and the clear and tanned gelatin areas can be observed. The diffraction persists following the fixing and post-fixing wash although at a reduced diffraction efficiency. The diffraction efficiency increases following the dehydration and drying steps.

TABLE II
KODAK PROCESSING SOLUTIONS

| KODAK D-19 DEVELOPER | | KODAK R-9 BLEACH BATH | |
|---|---|---|---|
| Dist. Water (50° C.) | 1.0 liter | Dist. Water | 1.0 liter |
| ELON (p-Methylamino-phenol Sulfate) | 4.4 grs | Potassium Dichromate | 9.5 grs |
| Sodium Sulfite, desiccated | 192.0 grs | Sulfuric Acid, conc. | 12.0 ml |
| Hydroquinone | 17.6 grs | KODAK S-13 STAIN REMOVER, SOLUTION B | |
| Sodium Carbonate, desiccated | 96.0 grs | | |
| Potassium Bromide | 10.0 grs | Dist. Water | 750 ml |
| Dist. Cold Water to Make | 2.0 liters | Sodium Bisulfite | 10.0 grs |
| | | Dist. Water to Make | 1.0 liter |
| KODAK SB-1 STOP BATH | | | |
| Dist. Water | 1.0 liter | KODAK F-24 NON-HARDENING FIX | |
| Acetic Acid (28%) (28% Acetic Acid is prepared by mixing 3 parts glacial acetic acid with 8 parts distilled water). | 48.0 ml | Dist. Water (50° C.) | 500 ml |
| | | Sodium Thiosulfate (Hypo) | 240.0 grs |
| | | Sodium Sulfite, desiccated | 10.0 grs |
| | | Sodium Bisulfite | 25.0 grs |
| | | Dist. Cold Water to Make | 1.0 liter |

EXAMPLES

A series of 4×5 Kodak 649F plates were exposed in a holographic optical system to two overlapping beams of coherent, expanded, collimated light. The exposure conditions included variations in exposure time, the ratio of intensities in the two overlapping beams, and spatial frequencies. The plates were then treated according to the process set forth above and as set forth in Table I which includes the times and temperatures for each step. The compositions of the Kodak processing compositions used is set forth in Table II.

Figure 2:
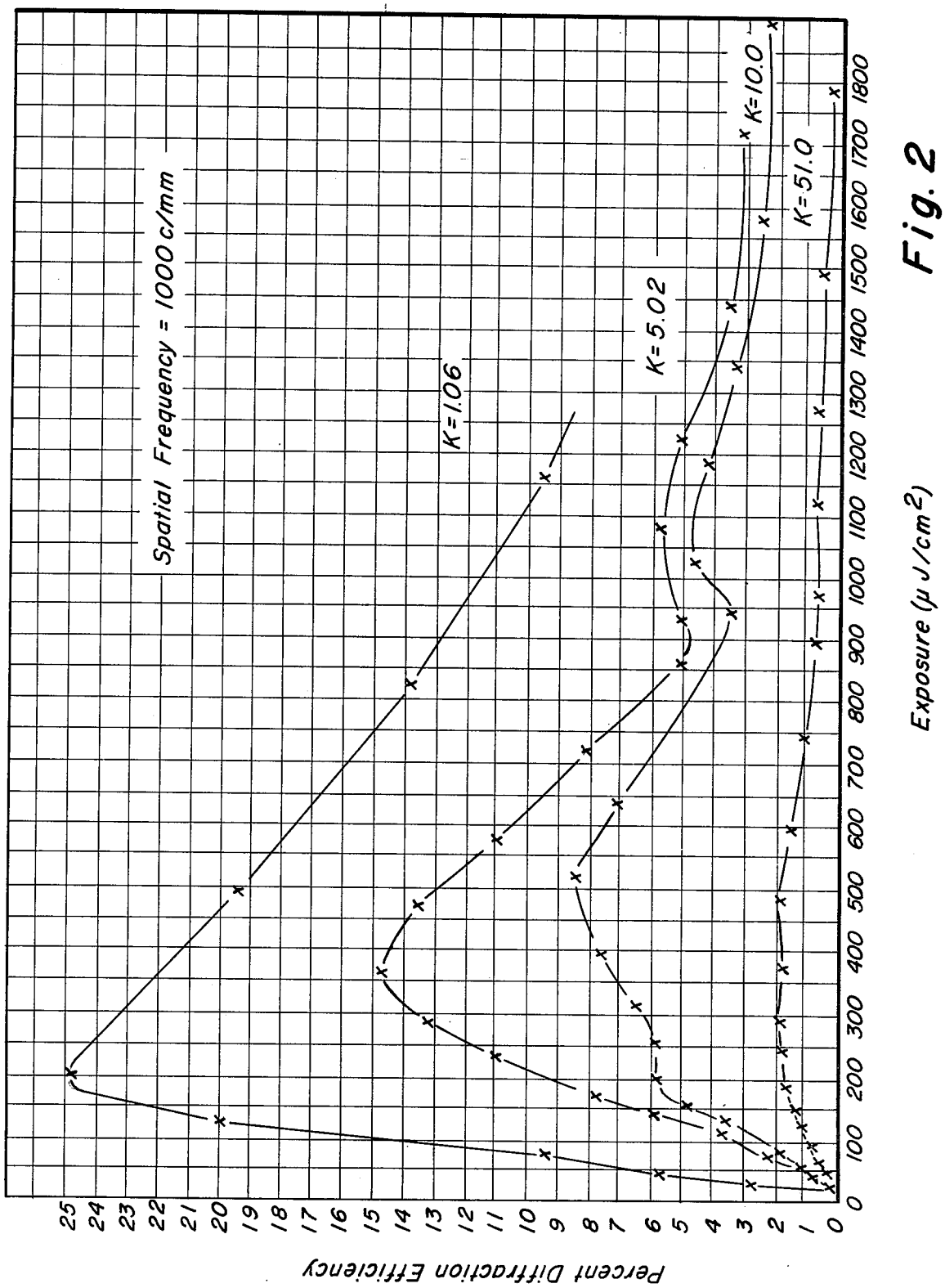
FIG. 2 is a graph showing percent diffraction efficiency as a function of exposure for the holograms of this invention with each curve representing a different interbeam ratio of light intensities (K value); and, FIG. 3 is a graph showing percent diffraction efficiency as a function of exposure for the holograms of this invention with each curve representing different spatial frequencies.
Figure 3:
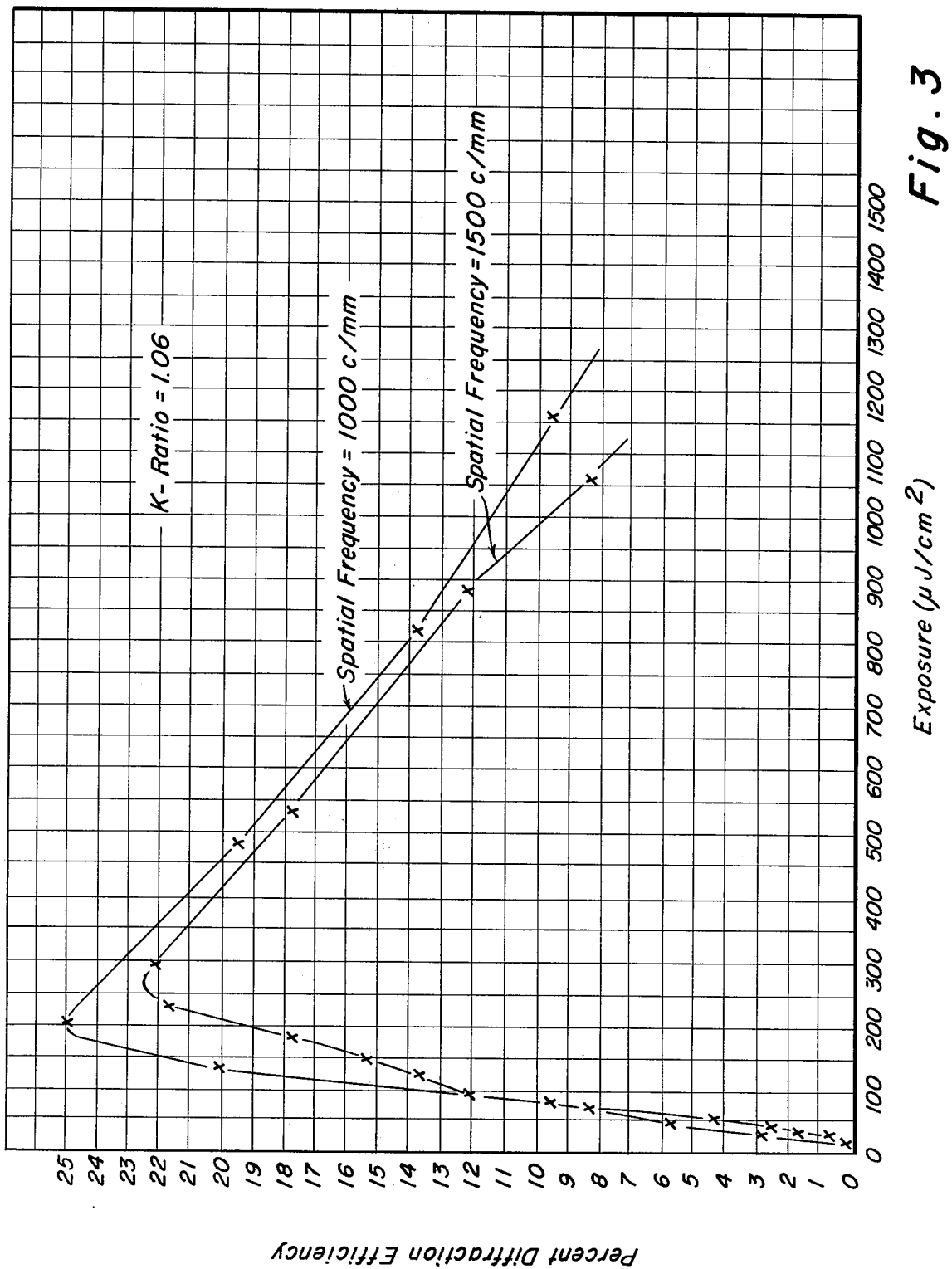

The resulting percent diffraction efficiency is shown in the graph of FIG. 1 as a function of exposure. An argon ion laser with a total intensity near 1450 $\mu w/cm^2$ in the recording plane at a wavelength of 514.5 nm was used to expose the plane wave gratings. The interbeam ratio of light intensities (K ratio) was 1.06, and a spatial frequency of 1000 c/mm was used. Sixty plane wave gratings at the respective exposures were prepared on five Kodak 649F plates. A peak percent diffraction efficiency of 25% is seen near an exposure of 200 $\mu J/cm^2$. The spread in data points at the respective exposures is seen to increase at the higher exposures. The data point spread is not seen in data taken from a single plate but only becomes apparent in comparing data points from two or more plates. The angular sensitivity for different plane wave gratings was measured for different exposures and found to be 3° for each grating. The effect of different K ratios is shown in the graph of FIG. 2. Not only does the peak percent diffraction efficiency decrease at the higher K ratios, but the exposure required to produce the peak percent diffraction efficiency is seen to increase at the higher K ratios through K=10. The effect of recording at spatial frequencies of 1000 c/mm and 1500 c/mm is described in the graph of FIG. 3. Very little difference is seen in the percent diffraction efficiency at the two different spatial frequencies.

It is expected that the process of this invention will be found suitable in recording phase volume holograms at low K ratios and at spatial frequencies in excess of 500 c/mm.

Plane wave gratings have also been prepared for the process involving the use of a tanning developer and a tanning bleach. Kodak's special developer SD-48 and Kodak R-9 bleach were respectively the tanning developer and the tanning bleach used. The plane wave gratings prepared demostrated a peak percent diffraction efficiency near 2.5% at an exposure of 175 $\mu J/cm^2$, a wavelength of 632.8 nm, and a spatial frequency of 1000 c/mm. The angular sensitivity approached 3°.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention, pertains, and as may be applied to the essential features hereinbefore set forth and fall within the scope of this invention or the limits of the claims.

What is claimed is:

1. A process for the production of a phase hologram, comprising the steps of:
    exposing silver halide photographic material in the exposure plane of a holographic optical system;
    developing the exposed photographic material with a non-tanning developer;
    bleaching the developed photographic material with a tanning bleach which removes the metallic silver of the metallic silver image areas while tanning the gelatin in the metallic silver image areas; and,
    fixing the bleached photographic material with a non-tanning fixing agent to remove the silver halide from the photographic material so as to form a phase hologram of a tanned gelatin in a gelatin matrix.

2. A process according to claim 1 wherein said tanning bleach comprises potassium dichromate.

3. A process according to claim 1 wherein said tanning bleach comprises potassium dichromate and sulfuric acid.

4. A process for the production of a phase hologram of a tanned gelatin in a gelatin matrix from a silver halide photographic material, comprising the steps of:
    exposing silver halide photographic material in the exposure plane of a holographic optical system;

developing the exposed photographic material with a non-tanning developer;
treating the developed photographic material with a stopping agent;
bleaching the developed photographic material with a tanning bleach which removes the silver of the metallic silver image areas while tanning the gelatin in the metallic silver image areas;
fixing the bleached photographic material with a non-tanning fix to remove the silver halide from the photographic material;
dehydrating the bleached and fixed photographic material; and,
drying the dehydrated photographic material so as to form a phase hologram of a tanned gelatin in a gelatin matrix wherein the difference in refractive indexes between the tanned gelatin and the untanned gelatin produces the diffraction that is the basis of the hologram.

5. A process for the production of a phase hologram of a tanned gelatin in a gelatin matrix from a silver halide photographic material, comprising the steps of:
exposing silver halide photographic material in the exposure plane of a holographic optical system;
developing the exposed photographic material with a non-tanning developer;
treating the developed photographic material with a stopping agent;
rinsing the developed and stopped photographic material;
bleaching the developed photographic material with a tanning bleach which dissolves and removes the silver of the metallic silver image areas while tanning the gelatin in the metallic silver image areas;
washing the bleached photographic material to remove remaining bleach;
treating the bleached photographic material with a clearing agent to remove any residual bleach;
rinsing the cleared photographic material;
fixing the photographic material with a non-tanning fix to remove the silver halide from the photographic material;
washing and rinsing the bleached and fixed photographic material;
dehydrating the bleached and fixed photographic material; and,
drying the dehydrated photographic material so as to form a phase hologram of a tanned gelatin in a gelatin matrix wherein the difference in refractive indexes between the tanned gelatin and the untanned gelatin produces the diffraction that is the basis of the hologram.

* * * * *